United States Patent [19]
Johnson

[11] Patent Number: 6,164,245
[45] Date of Patent: Dec. 26, 2000

[54] PET RESTRAINT HARNESS

[76] Inventor: Kenneth R. Johnson, 64 Rio del Mar Blvd., Aptos, Calif. 95003

[21] Appl. No.: 09/326,296

[22] Filed: Jun. 4, 1999

Related U.S. Application Data

[60] Provisional application No. 60/088,142, Jun. 5, 1998.

[51] Int. Cl.[7] ............................................. A01K 37/00
[52] U.S. Cl. ........................... 119/712; 119/788; 119/792
[58] Field of Search ................................. 119/712, 792, 119/856, 788, 783, 784

[56] References Cited

U.S. PATENT DOCUMENTS

| | | | |
|---|---|---|---|
| 225,715 | 3/1880 | Middleton | 119/856 |
| 354,394 | 12/1886 | Collie | 119/856 |
| 623,596 | 4/1899 | Covington | 119/784 |
| 1,906,043 | 4/1933 | Bernstein | 119/856 |
| 3,189,003 | 6/1965 | Canfield | 119/856 |
| 3,590,783 | 7/1971 | Purgett | 119/783 |
| 3,722,478 | 3/1973 | Smith | 119/784 |
| 5,613,467 | 3/1997 | Arakawa | 119/792 |
| 5,893,339 | 4/1999 | Liu | 119/792 |

*Primary Examiner*—Peter M. Poon
*Assistant Examiner*—Judith A. Nelson
*Attorney, Agent, or Firm*—Oppenheimer, Wolff & Donnelly, LLP; Claude A. S. Hamrick

[57] ABSTRACT

A pet restraint harness that includes a modified animal harness having quick release connectors and a lanyard attached to the rear portion of the harness and having a pre-determined length, the distal end of which is adapted to be secured to a fixed anchor in the floor or bed of a vehicle or other animal supporting surface. The length of the lanyard is selected so as to be as short as possible while still allowing the animal to stand comfortably.

6 Claims, 2 Drawing Sheets

PET RESTRAINT HARNESS

REFERENCE TO RELATED APPLICATION

This application claims the benefit of U.S. Provisional Application No. 60/088,142, filed on Jun. 5, 1998, entitled "Pet Restraint Harness"

BACKGROUND OF THE INVENTION

1. Field of the Invention

The present invention relates generally to pet restraint apparatus, and more particularly to pet harness for restraining dogs and other animals while in transit.

2. Brief Description of the Prior Art

Problems associated with the restraining of large animals such as dogs during transit either in an open bed truck platform or in a closed vehicle are well known. An unrestrained animal may leap from the vehicle and be lost or injured on the one hand, and may suffer injury due to rapid acceleration or stopping of the vehicle on the other. Moreover, an unrestrained animal in the back of a van, station wagon or utility vehicle may also cause injury to other occupants of the vehicle in the event of a rapid stop. While many attempts have been made to restrain animals, particularly in situations where the animal is carried in the open bed of a pickup truck, such restraints are not ideal in that they are primarily intended to keep the animal within the truck bed and do not necessarily deal with the issue of the animal's safety in the event of a collision or rapid stop of the vehicle. For example, the type of restraints that stretch across a truck bed from one side to the other, so as to allow the animal a degree of freedom of movement, often times subject the animal to injury where it either attempts to avoid the restraint and dangles therefrom over one side of the vehicle, or in the event of a rapid stop, crashes into the vehicle cab even though restrained.

There is therefore a need for an improved animal restraint mechanism having particular applicability to large animals such as dogs, horses and the like and that, while permitting freedom to move between a reclining or lying position and a standing position, otherwise prevents movement from a particular location on or within the vehicle. Such apparatus would not be limited to use in a vehicle in that it could also be used in other situation such as restraining the animal outside a business establishment while the owner is temporarily inside, or perhaps while the animal is at a watch post where space is limited, or even unlimited, but for one reason or another, it is desirable that the animal's position be narrowly defined.

SUMMARY OF THE INVENTION

It is therefore a principal object of the present invention to provide an improved animal restraint harness apparatus that humanely limits movement of the animal.

Another object of the invention is to provide a restraint apparatus of the type described which is particularly suited for use in vehicles for both limiting movement of the animal and at the same time, protecting the animal against rapid stops or starts of the vehicle.

Another object of the invention is to provide a restraint apparatus of the type described which is easy to apply to and remove from the animal.

Still another object of the invention is to provide a restraint apparatus that, when not used for fixed restraint, can have a leash attached thereto and used in the normal leash control situation.

Briefly, a presently preferred embodiment of the present invention includes a modified animal harness having quick release connectors and a lanyard attached to the rear portion of the harness and having a pre-determined length, the distal end of which is adapted to be secured to a fixed anchor in the floor or bed of a vehicle or other animal supporting surface. The length of the lanyard is selected so as to be as short as possible while still allowing the animal to stand comfortably.

An important advantage of the present invention is that it provides an apparatus that is comfortable in use by the animal, is easily attached and removed from the animal, and provides freedom of movement between a lying or reclining position and a standing position.

These and other objects and advantages of the present invention will no doubt become apparent to those skilled in the art after having read the following detailed description of the preferred embodiment which is illustrated in the several figures of the drawing.

IN THE DRAWINGS

DETAILED DESCRIPTION OF THE PREFERRED EMBODIMENT

Figure 1:
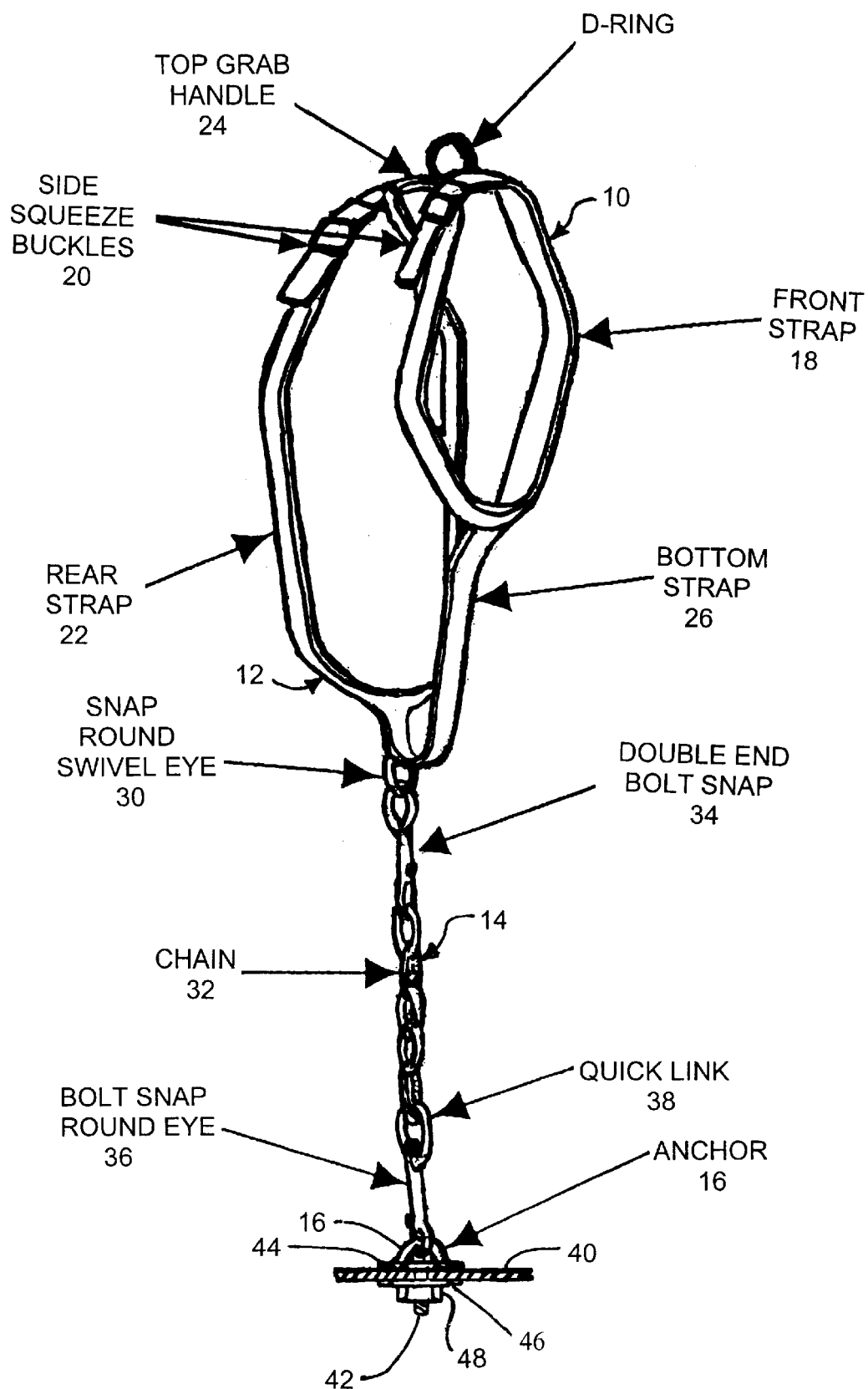
FIG. 1 is a perspective view showing a preferred embodiment of a pet restraint apparatus in accordance with the present invention suspended in space.

Referring now to FIG. 1 of the drawing, a pet restraint apparatus as illustrated at 10 including a harness 12, a lanyard 14, and an anchor clip 16. More specifically, the harness 12 includes a front strap 18 intended to wrap about the neck of the animal to be restrained and including a buckle or latch 20 for facilitating closure. A rear strap 22 is similarly configured to the front strap except that it is longer and is intended to wrap about the chest of the animal to be restrained. It likewise includes a buckle or other fastener 20. Spanning the upper extremities of the loops formed by straps 18 and 22 is a length of strapping or cording forming a grab handle 24 and having a D-ring or other fastener affixed thereto so as to receive a common walking leash. Spanning the lower extremities of the harness and joining together the bottom portions of straps 18 and 22 is a bottom strap or chest strap 26 attached to the front and rear straps by sewing or riveting or other well known means. Attached to the rear most portion of strap 26 at its juncture to rear strap 22 is a swivel connector or snap round swivel eye 30. The lanyard 14 attaching the harness 12 to the anchor bolt or clip or ring 16 is in the preferred embodiment formed by a chain 32 having a double ended bolt snap 34 affixed to one end and a bolt snap round eye swivel 36 affixed to the other. The snap 36 is in the preferred embodiment attached to chain 32 by means of a quick link 38. The anchor ring 16 is attached to a floor or other surface in a typical application by drilling a hole through the floor 40, passing a bolt 42 through a flange 44 attached to the anchor ring through the opening in floor 40 and a bottom washer 46. The attachment is completed by threading a nut 48 on to the distal end.

Figure 2:
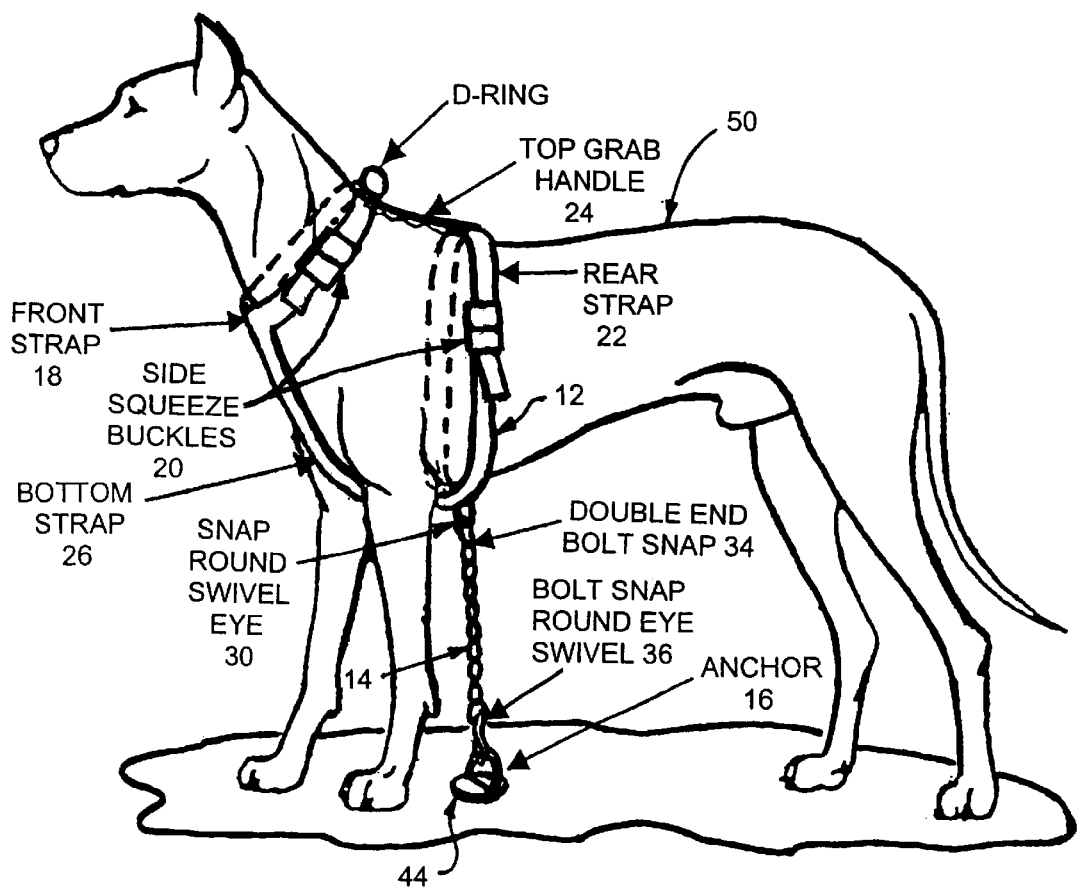
FIG. 2 is a perspective view illustrating the pet restraint apparatus of FIG. 1 mounted to a dog.

Turning now to FIG. 2 of the drawing, the restraint apparatus is shown in use restraining a large dog illustrated at 50. As shown, the harness 12 is mounted to the dog by opening the buckles 20 which are, in the preferred embodiment, plastic squeeze buckles or clasps. The front strap 18 is secured about the neck of the animal and the rear strap 22 is secured about the chest of the animal by a second snap clasp 20. Note that prior to fastening either the front strap or the rear strap, one of the animal's legs will have to be placed through the closed opening defined by the connection of the bottom strap 26 to the connection of the straps together by the grab handle or strap 24 at the dog's back. Note that the harness can be separated from the lanyard 14 at this time with the upper end of the lanyard being subsequently attached to swivel eye 30. The dog would then be positioned above anchor clip 16 and the attachment would be complete. Note that because the lanyard is flexible, the dog would be free to either lay down or stand up but once in the standing position, will have his movement substantially restrained. The amount of confinement is however, determined by the pet owner, but is preferably no more than slightly longer than that required to provide enough freedom for the animal to stand up. This is to say that the chain length should be adjusted by proper placement of the snap 34 on a length of chain such that the chain is long enough to allow the animal to comfortably stand but not long enough to allow him to jump or substantially move about the surface upon which he stands. Since the lower end of the chain must be free to swivel about the anchor 16, it is important that the swivel snap be attached thereto. This will allow the dog to freely rotate about the anchor should he choose and will allow the chain to assume a "lie-down" position relative to the floor should the animal decide to lie down. In order to further insure that the lanyard does not become twisted as the animal turns and leans relative thereto, the snap eye 30 is also swivel as indicated above.

The apparatus of the present invention is designed to keep dogs, horses or other large animals safely restrained while in the back of a truck, trailer, other vehicle or boat etc. The animal wears a full body harness that may also be used with a leash when the animal is not fixedly restrained. In the preferred embodiment, all straps are made out of woven nylon belting although it is to be understood that leather, rope, chain or other materials could be utilized. The side buckles are preferably made of snap buckles of the type commonly used with other strapping, and the chain and other hardware are selected to fit the particular animal being restrained with consideration being given to the tensile loads likely to be exerted thereupon in the event of rapid stops or starts of the vehicle and that ability of the animal to resist the restraint.

It will of course, be appreciated that other materials than those described above may be utilized. For example, the mechanical lanyard 14 made of chain and snap clips may be replaced by simple rope or leather strap. The true essence of the present invention is to provide a harness and suitable attachment mechanisms thereto such that the animal can be restrained from an attachment point at his breast and between his front legs at a point slightly therebehind. In so doing, the restraint will impose the most ergodynamically suited hold back forces on the animal and allow him to use his own natural instincts in standing up as he attempts to resist forces that would tend to throw him forward, backward or to the side.

Although the present invention has been described in terms of an alternative embodiment, it is anticipated that still other alterations and modifications will become apparent to those skilled in the art after having read the above disclosure. It is therefore intended that such disclosure be illustrative and not limiting, and that the appended claims be interpreted to include all such alterations and embodiments as fall within the true spirit and scope of the invention.

What I claim is:

1. An animal restraint for restricting movement of an animal between a lying position and a standing position directly above an anchor point, comprising:

a body harness having means for enveloping the lower neck and chest of an animal and having a first attachment means affixed to said harness at an attachment point located on the harness beneath the center of the animal's chest and slightly behind the animal's front legs when the harness is in use;

anchor means adapted for attachment to an animal supporting surface upon which the animal may either lie down or stand up; and a flexible lanyard having means at one end for engagement with said first attachment means, and having means at an opposite end adapted for attachment to said anchor means, the length of said flexible lanyard being approximately equal to the distance between the animal's chest and the supporting surface when the animal is standing.

2. An animal restraint as recited in claim 1 wherein said harness includes a front first strap for enveloping the neck of the animal, a second strap for enveloping the chest of the animal, and a bottom strap adapted to extend between the front legs of the animal, said bottom strap having one end attached to said first trap, and an opposite end attached to said second strap, said first attachment means being located proximate the point of attachment of said bottom strap to said second strap.

3. An animal restraint as recited in claim 2 wherein said harness further includes a top strap forming a grab handle positioned to extend along the backbone of the animal and having one end connected to said first strap and an opposite end connected to said second strap.

4. An animal restraint as recited in claim 3 wherein at least one of said first and second straps includes a releasable fastener means.

5. An animal restraint as recited in claim 2 wherein said first attachment means includes a swivelable snap fastener.

6. An animal restraint as recited in claim 1 wherein said lanyard is comprised of a predetermined length of multi-linked chain having a first snap fastener affixed to one end, and a second snap fastener affixed to the other end, the first snap fastener being adapted to engage said first attachment means, and said second snap fastener being adapted to engage said anchor means.

\* \* \* \* \*